Jan. 19, 1926. 1,570,378
G. A. EVANS
VEHICLE BRAKE APPARATUS
Filed July 26, 1922   2 Sheets-Sheet 1
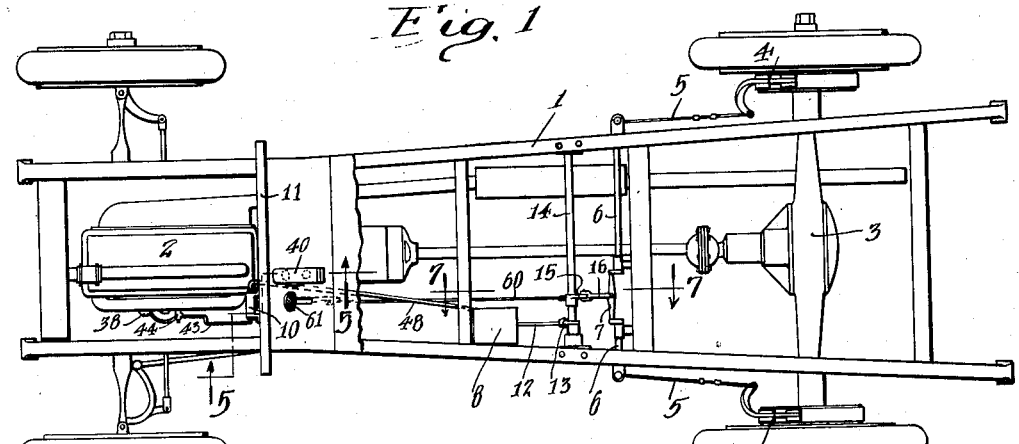
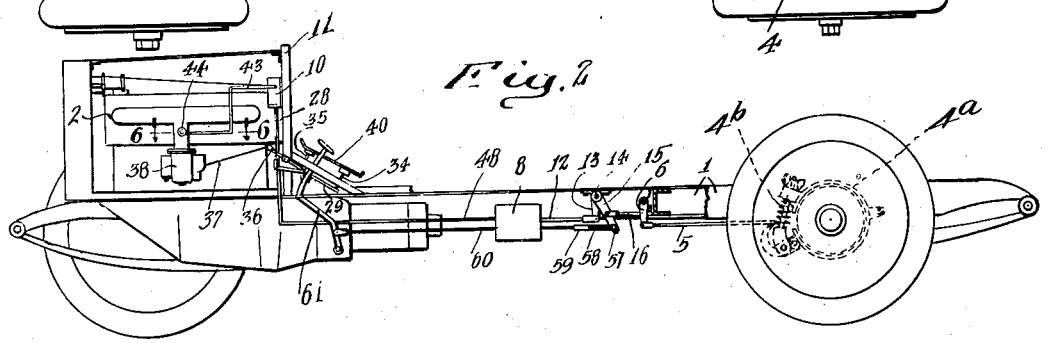
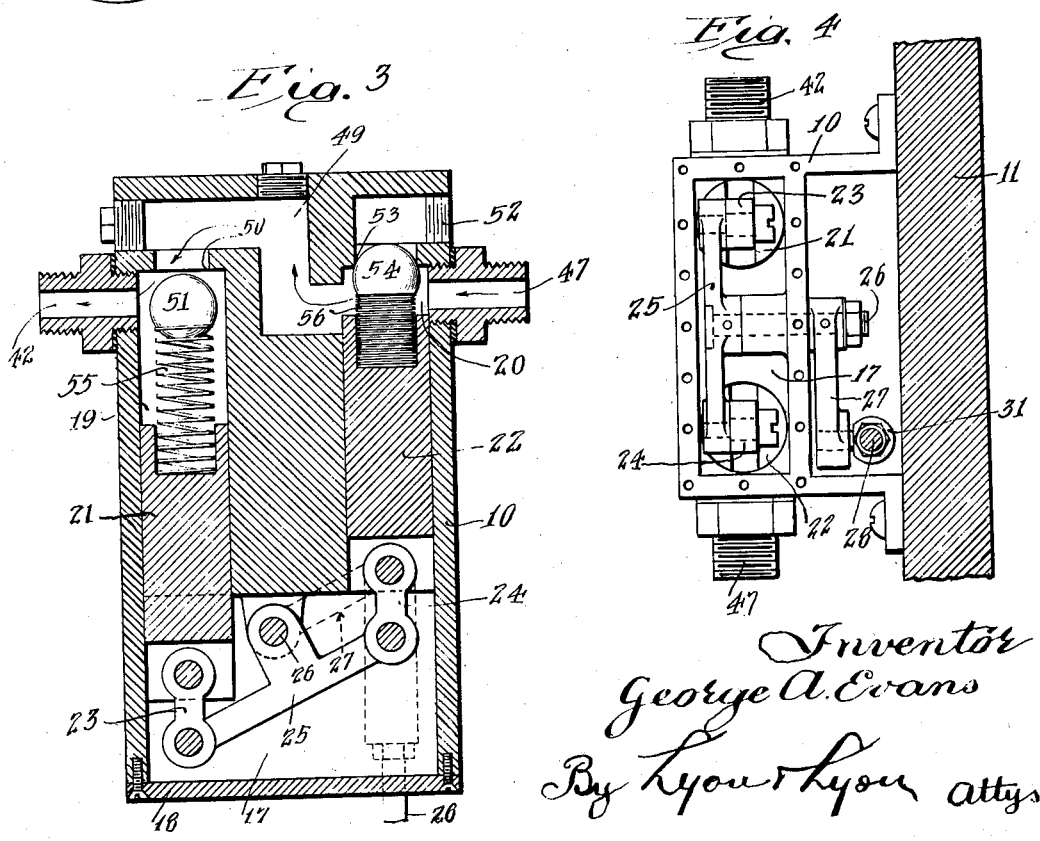
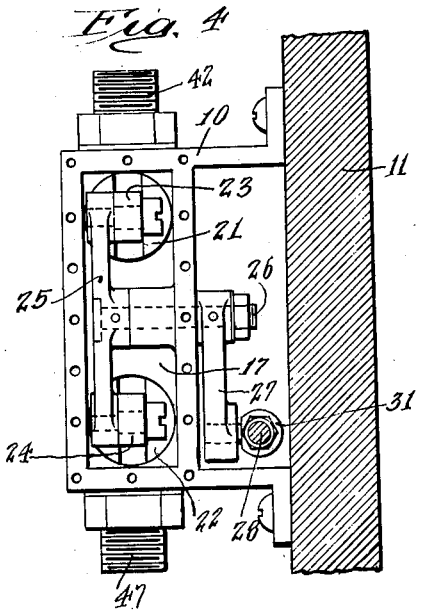
Inventor
George A. Evans
By Lyon & Lyon attys.

Jan. 19, 1926.                                                                    1,570,378
                                G. A. EVANS
                          VEHICLE BRAKE APPARATUS
                          Filed July 26, 1922                2 Sheets-Sheet 2
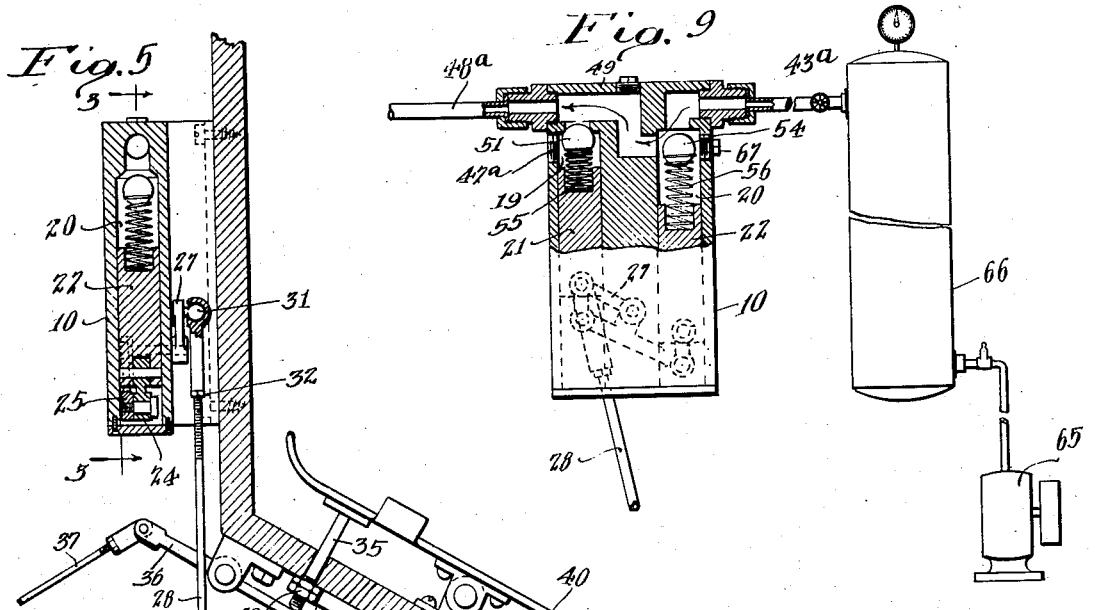
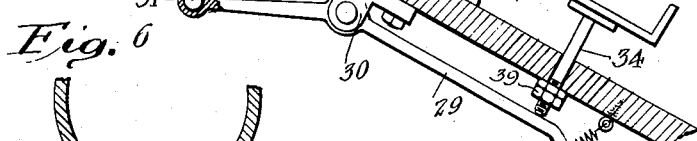
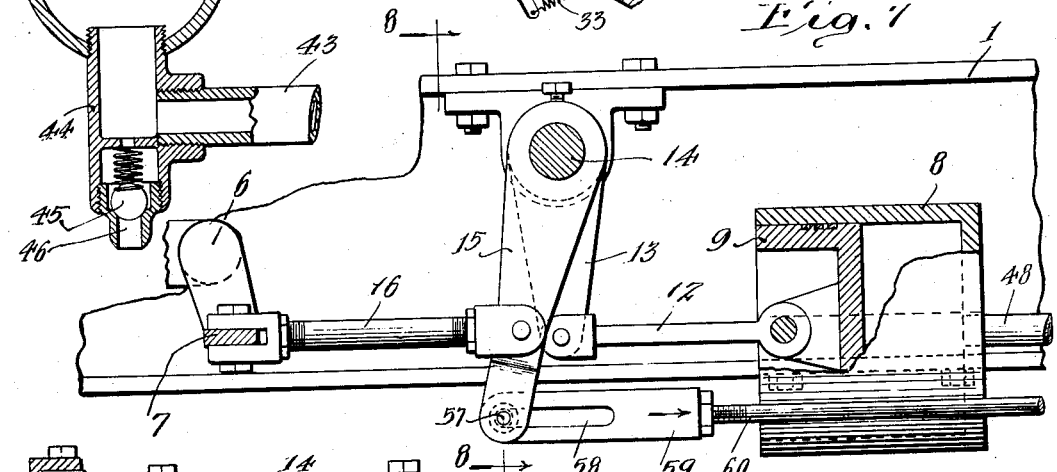
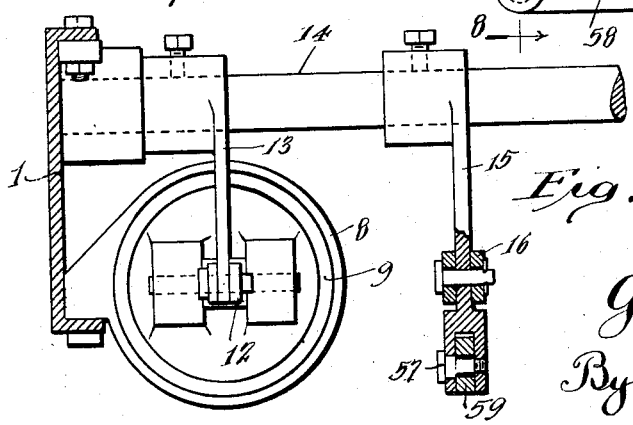
Inventor
George A. Evans.
By Lyon & Lyon attys Patented Jan. 19, 1926.

1,570,378

UNITED STATES PATENT OFFICE.

GEORGE A. EVANS, OF GLENDALE, CALIFORNIA.

VEHICLE BRAKE APPARATUS.

Application filed July 26, 1922. Serial No. 577,543.

*To all whom it may concern:*

Be it known that I, GEORGE A. EVANS, a citizen of the United States, residing at Glendale, in the county of Los Angeles and State of California, have invented a new and useful Vehicle Brake Apparatus, of which the following is a specification.

This invention relates to vehicle brake apparatus and is particularly directed to a brake apparatus to be associated with an automobile structure.

An object of the invention is to provide an automatic brake apparatus in which the standard type of automobile brake may be associated with pressure operated mechanism under control of a manually operated control device, while at the same time adapted for direct operation by the operator independent of such control device.

A further object is to associate such control device with the engine throttle mechanism whereby the engine speed is cut down simultaneously with the automatic application of the brake.

Another object is to provide a brake operating mechanism operated under the influence of the suction of the engine intake manifold, and combined with means for regulating the suction at high engine speeds.

Various other objects and advantages will be more fully apparent from the following description of the accompanying drawings, which form a part of this disclosure, and which illustrate a preferred form of embodiment of the invention:

Of the drawings:

Figure 1 is a plan view of a conventional automobile chassis with my improved brake apparatus applied thereto.

Fig. 2 is a side elevation with the near front wheel and part of the near rail of the frame removed.

Fig. 3 is an enlarged section on line 3—3 of Fig. 5.

Fig. 4 is a bottom view of Fig. 3 with the cover plate removed.

Fig. 5 is an enlarged section on line 5—5 of Fig. 1.

Fig. 6 is an enlarged detail section on line 6—6 of Fig. 2.

Fig. 7 is an enlarged detail section on line 7—7 of Fig. 1.

Fig. 8 is a section on line 8—8 of Fig. 7, and

Fig. 9 is a semi-diagrammatic section illustrating a modified application of the apparatus.

Referring particularly to Figures 1 and 2 of the drawings, the general arrangement of the apparatus is illustrated as applied to a conventional automobile chassis in which 1 designates the frame, carrying the engine 2 at its forward end, and 3 the rear axle assembly which includes the usual spring returned brakes 4, that is, brakes including brake bands such as the brake band 4$^a$, which is normally held off by a spring 4$^b$ (see Fig. 2) and with shafts 6, which shafts are journaled on the frame 1 and connected by a suitable equalizing bar 7. A brake operating cylinder 8 is attached to the frame 1 and contains a piston 9 which connects with the equalizing bar 7 as later explained, and a control device 10, preferably mounted on the partition 11, includes suitable operating means operable by the foot of the driver.

The piston 9 is pivotally connected by means of a connecting rod 12 (see particularly Figs. 7 and 8) to an arm 13 which is secured to a rock shaft 14 journaled on the chassis frame 1, and having a second arm 15 fixed thereto. A rod 16 pivotally connects the arm 15 with the equalizer bar 7 of the brake mechanism.

The control device 10 comprises a body having chamber 17 in its lower end closed by a cover plate 18, and provided with opposite vertical bores 19 and 20 in which slide plungers 21 and 22. The lower ends of these plungers are connected by links 23 and 24 respectively, to a rock lever 25 and said rock lever is fixed to a short shaft 26 journaled in the housing 10 and extending outwardly therefrom. The outer end of said shaft 26 has fixed to it, an arm 27 which is connected by a link 28 with a control lever 29 journaled in a bracket 30 fixed to the under side of the foot-board, (see Fig. 5) the link 28 being connected to the arm 27 and lever 29 by universal connections 31 and being provided with means 32 by which its length may be adjusted. I provide a construction in which the brakes may be applied independent of the carburetor and likewise the carburetor may be actuated independently of the brakes; this construction preferably includes means operated by the control lever for opening the throttle and for applying the brakes, and constructed in such a way that the means for opening the throttle is unattached to but actuated by the control lever; likewise the means for applying the brakes is actuated by but unattached to the control lever.

The control lever 29 is returned or normalized by a spring 33 and is adapted to be operated by a plunger 34 which is slidable through the foot-board. A similar plunger 35 engages a lever 36 which connects with a rod 37 controlling the carbureter 38 of the engine and both plungers are limited in their outward movements by nuts 39 and their heads rest against a foot-treadle 40, so that they may be alternately operated by the foot-treadle, which is centrally pivoted in a bracket 41 on the foot-board.

This arrangement provides for an alternate operation of the foot throttle controlling the engine and the control device controlling the automatic brake apparatus, and enables the throttle to be closed and the brake applied in the same movement of the chauffeur's foot.

Referring again to Figure 3, the control device has a port 42 communicating by means of a conduit 43, with the intake manifold of the engine through a fitting 44 which has a ball valve 45 spring pressed outwardly to normally close the port 46, said valve serving as an automatic means for supplying auxiliary air to the manifold when the throttle is closed. A port 47 communicates by means of a conduit 48, with the brake cylinder 8, said port 47 also communicating with a passage 49.

Between the port 42 and said passage is a valve seat 50 with which a ball-valve 51 cooperates to close communication between the port 42 and said passage, and between said passage and an air port 52 is a valve seat 53 with which cooperates a similar ball-valve 54 to close communication between said passage and the atmosphere. Engaging the respective ball-valves 51 and 54 are springs 55 and 56 the lower ends of which seat in recesses in the respective plungers 21 and 22.

The arm 15 of the brake operating mechanism extends below its connection with the rod 16, and carries a stud 57 (see Figs. 7 and 8) which engages into an elongated slot 58 in a connecting member 59 attached to the rear end of a rod 60. The rod 60 extends forwardly and is connected to the usual foot-brake lever 61. The elongated slot provides a loose connection between the brake operating mechanism by means of which the foot brake may be operated manually by the foot lever 61 or automatically by the piston 9.

Figure 5 shows the member 40 in its neutral position, in which the throttle remains closed and the pneumatic control device 10 is at rest.

In operating the manually controlled member, from its neutral position shown in Fig. 5, tilting the rear end down will let the throttle remain closed, that is to say, it will be unaffected, but the movement will depress the brake plunger 34 and this will rock the control lever 29. This causes the link 28 to be pushed upward with the result that the shaft 26 of the control device is rocked to lower the plunger 21 and elevate the plunger 22. By such movement of the plungers the tension of the spring 56 is increased so as to firmly hold the valve 54 closed; and the spring 55 relieved of tension to permit the valve 51 to open, as shown in Fig. 3, thereby establishing communication between the ports 42 and 47 through the passage 49 whereupon the suction of the engine manifold is effective, as indicated by the arrows, to reduce the pressure in the brake operating cylinder 8, causing a braking operation of the brake mechanism.

In the return movement the valve 51 will be closed to cut off the manifold suction from the passage 49, and the valve 54 opened to open said passage, and consequently the cylinder 8 through the conduit 48, to the atmosphere by way of the port 52, thereby allowing a normalizing of the brake mechanism.

By tilting the member 40 down at its upper end (from its neutral position) the lever 36 will be actuated to open the throttle against the force of its spring, leaving the vacuum device 10 at rest and unaffected.

In Fig. 9 I have illustrated a manner in which the control device may be incorporated in an apparatus in which, instead of utilizing the manifold suction to operate the brake, said operation is effected by pressure generated by a suitable means 65 and stored in a storage tank 66. In this instance the fittings to which the conduits are connected are rearranged so that the conduit 48ª leading to the brake operating cylinder communicates directly with the passage 49 and the conduit 43ª leading to the pressure tank 66 is controlled by the valve 54, the chamber 19 in this arrangement being open to the atmosphere. Further in this arrangement the position of the arm 27 is reversed so that an upward movement of the link 28 will cause the plunger 21 to be elevated.

With the plungers so positioned the pressure is effective as indicated by the arrows in Fig. 9, to effect an operation of the brake mechanism, a reversal of said plungers closing the valve 54 against the pressure, and opening the valve 51 to open the brake cylinder to the atmosphere by way of port 42ª, the previously described port 47 being closed by a plug 67.

While the apparatus above described is well adapted for the purposes primarily stated, it is to be understood that I do not wish to limit the invention to the particular embodiment herein illustrated and described, for it is susceptible of embodiment in various other forms, all coming within the scope of the following claims.

I claim:

1. In a brake apparatus for motor vehicles, the combination of a spring-returned brake mechanism, brake operating mechanism including a cylinder having a piston, means for varying the pressure in the cylinder including a control device having a valve to establish communication between the control device and the cylinder to apply the brake, and another valve operating to effect the release of the brake, a spring corresponding to each valve and engaging each valve, and a manually operated member with means for imparting movement through each spring to operate its corresponding valve.

2. In a brake apparatus for motor vehicles including an engine and a fuel supply device, a throttle for said device, a brake mechanism, pressure-operated means for operating the brake mechanism, pneumatic control means for said brake mechanism, and a single foot operated control member unconnected to the throttle and unconnected to the pressure operated means, and having a neutral position in which it permits the throttle to remain closed, and in which the pressure operated means leaves the brakes in their "off" position, said single foot operated control member operating when moved in one direction, to open the throttle and leave the pneumatic control means unaffected, and operating when moved in the opposite direction to actuate the pneumatic control device and cause an application of the brake mechanism to apply the brake and leaving the throttle unaffected.

3. In a brake apparatus for motor vehicles including an engine and a spring normalized brake mechanism, a brake operating mechanism including a cylinder and a piston, a control device communicating with said cylinder and with the intake manifold of the engine, means for operating said control device to establish direct communication between the cylinder and manifold whereby the suction in said manifold causes an operation of the brake mechanism, and to alternately close such direct communication and open the cylinder to the atmosphere to release the brake, and automatic means admitting air to the manifold at high engine speeds when the throttle is closed.

4. In an apparatus for motor vehicles, the combination of a brake mechanism, brake operating mechanism including a cylinder having a piston, pressure varying means effecting an operation of said piston, and a control device including a body having a first port communicating with said means, a second port communicating with said cylinder and a third port open to the atmosphere, a valve controlling communication between the first and second ports, a second valve controlling the third port, a spring engaging each valve, and alternately operable members for varying the tension of the springs to alternately permit an operation of the valves.

5. In a brake apparatus for motor vehicles including a gas-engine and brake mechanism, a foot lever supported near its middle point to rock, a pneumatic device for actuating the brake mechanism, a pneumatic control device for controlling the same, means unattached to, but actuated by one end of the foot-lever, for controlling the pneumatic control device, and a throttle lever unattached to, but controlled by the other end of the foot lever and operating to permit the automatic closing of the throttle when the foot lever is actuated to operate the control device to apply the brakes.

6. In a brake apparatus for motor vehicles including an engine and a carburetor, a throttle for the engine, a brake mechanism, pressure operated means for operating the brake mechanism, a treadle lever mounted to rock on an axis and having a neutral position, means unattached to, but actuated by the treadle lever when it is rocked in one direction from its neutral position for opening the throttle, and means unattached to, but actuated by the treadle lever when it is rocked in the opposite direction from its neutral position to actuate the brake mechanism to apply the brakes, the opening movement of the throttle being independent of the brake, and the application of the brake being independent of the opening movement of the throttle.

Signed at Los Angeles California this 18th day of July 1922.

GEORGE A. EVANS.